United States Patent
Maeng (10) Patent No.: US 8,886,392 B1
(45) Date of Patent: Nov. 11, 2014

(54) METHODS, DEVICES, AND MEDIUMS ASSOCIATED WITH MANAGING VEHICLE MAINTENANCE ACTIVITIES

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 0 days.

(21) Appl. No.: 13/333,717

(22) Filed: Dec. 21, 2011

(51) Int. Cl.
*G06F 19/00* (2011.01)

(52) U.S. Cl.
USPC ....... 701/29.4; 701/29.1; 701/32.1; 701/33.4; 701/33.7; 701/33.8; 701/33.9; 701/34.2

(58) Field of Classification Search
USPC ........... 701/22, 29, 29.4, 36, 33.8, 29.1, 29.3, 701/32.1, 33.4, 33.7, 33.9, 34.2; 340/438
See application file for complete search history.

(56) References Cited

U.S. PATENT DOCUMENTS

| | | | |
|---|---|---|---|
| 2,995,318 A | 8/1961 | Cocharo | |
| 4,303,978 A | 12/1981 | Shaw | |
| 4,441,359 A * | 4/1984 | Ezoe | 73/116.06 |
| 4,528,563 A | 7/1985 | Takeuchi | |
| 4,591,976 A | 5/1986 | Webber | |
| 4,829,434 A | 5/1989 | Karmel | |
| 4,907,159 A | 3/1990 | Mauge | |
| 5,008,678 A | 4/1991 | Herman | |
| 5,031,330 A | 7/1991 | Stuart | |
| 5,045,937 A | 9/1991 | Myrick | |
| 5,111,401 A | 5/1992 | Everett, Jr. | |
| 5,115,245 A | 5/1992 | Wen | |
| 5,245,909 A | 9/1993 | Corrigan | |
| 5,287,199 A | 2/1994 | Zoccolillo | |
| 5,303,297 A | 4/1994 | Hillis | |
| 5,339,086 A | 8/1994 | DeLuca | |
| 5,341,301 A | 8/1994 | Shirai | |
| 5,438,361 A | 8/1995 | Coleman | |
| 5,471,214 A | 11/1995 | Faibish | |
| 5,506,963 A | 4/1996 | Ducateau | |
| 5,532,706 A | 7/1996 | Reinhardt | |
| 5,552,773 A | 9/1996 | Kuhnert | |
| 5,555,503 A | 9/1996 | Kyrtsos et al. | |
| 5,572,201 A | 11/1996 | Graham | |
| 5,579,219 A | 11/1996 | Mori et al. | |
| 5,581,462 A | 12/1996 | Rogers | |
| 5,585,798 A | 12/1996 | Yoshioka | |
| 5,617,085 A | 4/1997 | Tsutsumi | |
| 5,646,612 A | 7/1997 | Byon | |
| 5,749,060 A | 5/1998 | Graf | |
| 5,751,211 A | 5/1998 | Nishimura | |
| 5,761,320 A | 6/1998 | Farinelli | |
| 5,786,998 A | 7/1998 | Neeson | |
| 5,794,164 A | 8/1998 | Beckert et al. | |
| 5,872,508 A | 2/1999 | Taoka | |
| 5,907,293 A | 5/1999 | Tognazzini | |
| 5,915,214 A | 6/1999 | Reece | |
| 5,943,427 A | 8/1999 | Massie | |

(Continued)

*Primary Examiner* — Fadey Jabr
*Assistant Examiner* — Aaron L Troost
(74) *Attorney, Agent, or Firm* — Stolowitz Ford Cowger LLP (57) ABSTRACT

A method, device, and/or medium associated with managing vehicle maintenance activities may include monitoring data associated with an operating condition of a particular vehicle and updating historic operational data associated with the particular vehicle based on the data associated with the operating condition of the particular vehicle. The updated historic operational data may be updated with a predetermined maintenance standard associated with a substantially similar type of vehicle and a maintenance recommendation may be generated based, at least in part, on a result of the comparing.

42 Claims, 6 Drawing Sheets

(56) References Cited

U.S. PATENT DOCUMENTS

| | | | |
|---|---|---|---|
| 5,948,040 A | 9/1999 | DeLorme et al. | |
| 5,951,620 A | 9/1999 | Ahrens et al. | |
| 5,956,250 A | 9/1999 | Gudat et al. | |
| 5,959,536 A | 9/1999 | Chambers | |
| 5,963,092 A | 10/1999 | VanZalinge | |
| 5,964,822 A | 10/1999 | Alland | |
| 5,966,658 A | 10/1999 | Kennedy, III | |
| 5,969,598 A | 10/1999 | Kimura | |
| 5,977,906 A | 11/1999 | Ameen | |
| 5,983,092 A | 11/1999 | Whinnett | |
| 5,983,161 A | 11/1999 | Lemelson | |
| 6,009,330 A | 12/1999 | Kennedy, III | |
| 6,009,403 A | 12/1999 | Sato | |
| 6,028,537 A | 2/2000 | Suman | |
| 6,028,548 A | 2/2000 | Farmer | |
| 6,032,089 A | 2/2000 | Buckley | |
| 6,054,950 A | 4/2000 | Fontana | |
| 6,060,989 A | 5/2000 | Gehlot | |
| 6,061,709 A | 5/2000 | Bronte | |
| 6,075,467 A | 6/2000 | Ninagawa | |
| 6,097,285 A | 8/2000 | Curtin | |
| 6,128,608 A | 10/2000 | Barnhill | |
| 6,148,261 A | 11/2000 | Obradovich | |
| 6,150,961 A | 11/2000 | Alewine | |
| 6,154,123 A | 11/2000 | Kleinberg | |
| 6,161,071 A | 12/2000 | Shuman | |
| 6,163,711 A | 12/2000 | Juntunen | |
| 6,166,627 A | 12/2000 | Reeley | |
| 6,167,253 A | 12/2000 | Farris | |
| 6,169,894 B1 | 1/2001 | McCormick | |
| 6,175,728 B1 | 1/2001 | Mitama | |
| 6,175,782 B1 | 1/2001 | Obradovich | |
| 6,181,922 B1 | 1/2001 | Iwai | |
| 6,181,994 B1 | 1/2001 | Colson | |
| 6,182,006 B1 | 1/2001 | Meek | |
| 6,185,491 B1 | 2/2001 | Gray | |
| 6,202,027 B1 | 3/2001 | Alland | |
| 6,203,366 B1 | 3/2001 | Muller | |
| 6,204,804 B1 | 3/2001 | Andersson | |
| 6,226,389 B1 | 5/2001 | Lemelson, III | |
| 6,233,468 B1 | 5/2001 | Chen | |
| 6,236,652 B1 | 5/2001 | Preston | |
| 6,240,365 B1 | 5/2001 | Bunn | |
| 6,243,450 B1 | 6/2001 | Jansen | |
| 6,252,544 B1 | 6/2001 | Hoffberg | |
| 6,275,231 B1 | 8/2001 | Obradovich | |
| D448,366 S | 9/2001 | Youngers | |
| 6,292,109 B1 | 9/2001 | Murano | |
| 6,292,747 B1 | 9/2001 | Amro | |
| 6,294,987 B1 | 9/2001 | Matsuda | |
| 6,297,732 B2 | 10/2001 | Hsu | |
| 6,298,302 B2 | 10/2001 | Walgers | |
| 6,314,326 B1 | 11/2001 | Fuchu | |
| 6,326,903 B1 | 12/2001 | Gross | |
| 6,327,536 B1 | 12/2001 | Tsuji | |
| 6,362,748 B1 | 3/2002 | Huang | |
| 6,374,286 B1 | 4/2002 | Gee | |
| 6,377,860 B1 | 4/2002 | Gray | |
| 6,382,897 B2 | 5/2002 | Mattio | |
| 6,389,340 B1 | 5/2002 | Rayner | |
| 6,401,029 B1 | 6/2002 | Kubota | |
| 6,405,132 B1 | 6/2002 | Breed | |
| 6,408,174 B1 | 6/2002 | Steijer | |
| 6,417,782 B1 | 7/2002 | Darnall | |
| 6,421,429 B1 | 7/2002 | Merritt | |
| 6,429,789 B1 | 8/2002 | Kiridena | |
| 6,429,812 B1 | 8/2002 | Hoffberg | |
| 6,430,164 B1 | 8/2002 | Jones | |
| 6,442,485 B2 | 8/2002 | Evans | |
| 6,445,308 B1 | 9/2002 | Koike | |
| 6,452,484 B1 | 9/2002 | Drori | |
| 6,484,080 B2 | 11/2002 | Breed | |
| 6,493,338 B1 | 12/2002 | Preston | |
| 6,496,107 B1 | 12/2002 | Himmelstein | |
| 6,496,117 B2 | 12/2002 | Gutta | |
| 6,496,689 B1 | 12/2002 | Keller | |
| 6,505,100 B1 | 1/2003 | Stuempfle | |
| 6,515,595 B1 | 2/2003 | Obradovich | |
| 6,522,875 B1 | 2/2003 | Dowling | |
| 6,559,773 B1 | 5/2003 | Berry | |
| 6,571,136 B1 | 5/2003 | Staiger | |
| 6,584,403 B2 | 6/2003 | Bunn | |
| 6,611,740 B2 * | 8/2003 | Lowrey et al. | 701/29.4 |
| D479,228 S | 9/2003 | Sakaguchi et al. | |
| 6,614,349 B1 | 9/2003 | Proctor | |
| 6,615,137 B2 | 9/2003 | Lutter | |
| 6,616,071 B2 | 9/2003 | Kitamura | |
| 6,622,083 B1 | 9/2003 | Knockeart | |
| 6,629,033 B2 | 9/2003 | Preston | |
| 6,641,087 B1 | 11/2003 | Nelson | |
| 6,647,270 B1 | 11/2003 | Himmelstein | |
| 6,647,328 B2 | 11/2003 | Walker | |
| 6,670,912 B2 | 12/2003 | Honda | |
| 6,675,081 B2 | 1/2004 | Shuman | |
| 6,677,854 B2 * | 1/2004 | Dix | 340/438 |
| 6,681,121 B1 | 1/2004 | Preston | |
| 6,690,681 B1 | 2/2004 | Preston | |
| 6,707,421 B1 | 3/2004 | Drury | |
| 6,708,100 B2 | 3/2004 | Russell | |
| 6,714,139 B2 | 3/2004 | Saito | |
| 6,718,187 B1 | 4/2004 | Takagi | |
| 6,725,031 B2 | 4/2004 | Watler | |
| 6,734,799 B2 | 5/2004 | Munch | |
| 6,738,697 B2 | 5/2004 | Breed | |
| 6,745,153 B2 * | 6/2004 | White et al. | 702/184 |
| 6,771,208 B2 | 8/2004 | Lutter | |
| 6,771,629 B1 | 8/2004 | Preston | |
| 6,778,073 B2 | 8/2004 | Lutter | |
| 6,778,924 B2 | 8/2004 | Hanse | |
| 6,782,315 B2 | 8/2004 | Lu | |
| 6,785,551 B1 | 8/2004 | Richard | |
| 6,792,351 B2 | 9/2004 | Lutter | |
| 6,816,458 B1 | 11/2004 | Kroon | |
| 6,895,238 B2 | 5/2005 | Newell | |
| 6,895,240 B2 | 5/2005 | Laursen | |
| 6,901,057 B2 | 5/2005 | Rune | |
| 6,906,619 B2 | 6/2005 | Williams | |
| 6,920,129 B2 | 7/2005 | Preston | |
| 6,925,368 B2 | 8/2005 | Funkhouser et al. | |
| 6,937,732 B2 | 8/2005 | Ohmura | |
| 6,952,155 B2 | 10/2005 | Himmelstein | |
| 6,972,669 B2 | 12/2005 | Saito | |
| 6,973,030 B2 | 12/2005 | Pecen | |
| 6,980,092 B2 | 12/2005 | Turnbull | |
| 6,993,511 B2 | 1/2006 | Himmelstein | |
| 7,000,469 B2 | 2/2006 | Foxlin | |
| 7,006,950 B1 | 2/2006 | Greiffenhagen | |
| 7,024,363 B1 | 4/2006 | Comerford | |
| 7,079,993 B2 | 7/2006 | Stephenson | |
| 7,089,206 B2 | 8/2006 | Martin | |
| 7,092,723 B2 | 8/2006 | Himmelstein | |
| 7,120,129 B2 | 10/2006 | Ayyagari | |
| 7,123,926 B2 | 10/2006 | Himmelstein | |
| 7,146,260 B2 | 12/2006 | Preston | |
| 7,151,768 B2 | 12/2006 | Preston | |
| 7,158,956 B1 | 1/2007 | Himmelstein | |
| 7,164,662 B2 | 1/2007 | Preston | |
| 7,171,189 B2 | 1/2007 | Bianconi | |
| 7,178,049 B2 | 2/2007 | Lutter | |
| 7,187,947 B1 | 3/2007 | White | |
| 7,206,305 B2 | 4/2007 | Preston | |
| 7,207,042 B2 | 4/2007 | Smith | |
| 7,215,965 B2 | 5/2007 | Fournier | |
| 7,221,669 B2 | 5/2007 | Preston | |
| 7,239,949 B2 | 7/2007 | Lu | |
| 7,249,266 B2 | 7/2007 | Margalit | |
| 7,257,426 B1 | 8/2007 | Witkowski | |
| 7,263,332 B1 | 8/2007 | Nelson | |
| 7,269,188 B2 | 9/2007 | Smith | |
| 7,272,637 B1 | 9/2007 | Himmelstein | |
| 7,274,988 B2 | 9/2007 | Mukaiyama | |
| 7,277,693 B2 | 10/2007 | Chen | |
| 7,283,567 B2 | 10/2007 | Preston | |
| 7,283,904 B2 | 10/2007 | Benjamin | |

(56) References Cited

U.S. PATENT DOCUMENTS

| | | |
|---|---|---|
| 7,286,522 B2 | 10/2007 | Preston |
| 7,317,696 B2 | 1/2008 | Preston |
| 7,343,160 B2 | 3/2008 | Morton |
| 7,375,728 B2 | 5/2008 | Donath |
| 7,379,707 B2 | 5/2008 | DiFonzo |
| 7,411,982 B2 | 8/2008 | Smith |
| 7,418,476 B2 | 8/2008 | Salesky |
| 7,450,955 B2 | 11/2008 | Himmelstein |
| 7,506,020 B2 | 3/2009 | Ellis |
| 7,508,810 B2 | 3/2009 | Moinzadeh |
| 7,509,134 B2 | 3/2009 | Fournier et al. |
| 7,587,370 B2 | 9/2009 | Himmelstein |
| 7,594,000 B2 | 9/2009 | Himmelstein |
| 7,596,391 B2 | 9/2009 | Himmelstein |
| 7,599,715 B2 | 10/2009 | Himmelstein |
| 7,614,055 B2 | 11/2009 | Buskens et al. |
| 7,664,315 B2 | 2/2010 | Woodfill |
| 7,702,437 B2 * | 4/2010 | Gilbert ........................ 701/33.8 |
| 7,733,853 B2 | 6/2010 | Moinzadeh et al. |
| 7,747,281 B2 | 6/2010 | Preston |
| 7,778,739 B2 | 8/2010 | Preston et al. |
| 7,778,746 B2 * | 8/2010 | McLeod et al. ................ 701/22 |
| 7,848,763 B2 | 12/2010 | Fournier et al. |
| 2001/0009855 A1 | 7/2001 | L'Anson |
| 2002/0012329 A1 | 1/2002 | Atkinson |
| 2002/0022927 A1 | 2/2002 | Lemelson et al. |
| 2002/0070852 A1 | 6/2002 | Trauner |
| 2002/0095501 A1 | 7/2002 | Chiloyan et al. |
| 2002/0105423 A1 | 8/2002 | Rast |
| 2002/0144010 A1 | 10/2002 | Younis |
| 2003/0060188 A1 | 3/2003 | Gidron |
| 2003/0088346 A1 * | 5/2003 | Calkins et al. ................ 701/29 |
| 2003/0158614 A1 | 8/2003 | Friel |
| 2004/0162064 A1 | 8/2004 | Himmelstein |
| 2004/0164228 A1 | 8/2004 | Fogg |
| 2005/0009506 A1 | 1/2005 | Smolentzov |
| 2005/0070221 A1 | 3/2005 | Upton |
| 2005/0130656 A1 | 6/2005 | Chen |
| 2005/0153654 A1 | 7/2005 | Anderson |
| 2005/0260984 A1 | 11/2005 | Karabinis |
| 2005/0275505 A1 | 12/2005 | Himmelstein |
| 2005/0278712 A1 | 12/2005 | Buskens et al. |
| 2007/0115868 A1 | 5/2007 | Chen |
| 2007/0115897 A1 | 5/2007 | Chen |
| 2008/0092140 A1 | 4/2008 | Doninger et al. |
| 2008/0208405 A1 * | 8/2008 | Alrabady et al. ................ 701/36 |
| 2010/0042952 A1 * | 2/2010 | Geesey ........................ 715/851 |
| 2010/0073158 A1 * | 3/2010 | Uesaka et al. ............. 340/450.2 |
| 2010/0179717 A1 * | 7/2010 | Gilbert ........................ 701/29 |
| 2010/0241312 A1 | 9/2010 | Preston et al. |
| 2010/0312433 A1 | 12/2010 | Preston et al. |
| 2010/0332357 A1 | 12/2010 | Preston et al. |
| 2011/0112717 A1 * | 5/2011 | Resner ........................ 701/33 |
| 2012/0005107 A1 * | 1/2012 | Lowden et al. ................ 705/305 |

* cited by examiner

METHODS, DEVICES, AND MEDIUMS ASSOCIATED WITH MANAGING VEHICLE MAINTENANCE ACTIVITIES

BACKGROUND

Known vehicle maintenance services may be performed when a vehicle is no longer operating properly. For example, the vehicle may overheat during operation, develop an oil leak, have an engine that misfires, etc. The vehicle may begin operating improperly at an inconvenient place or time for the vehicle operator. Upon recognizing the improper operation of the vehicle, the vehicle operator may take the vehicle to a service provider for repair.

The vehicle operator may take the vehicle to the service provider for regular scheduled maintenance visits. Nevertheless, the vehicle may begin operating improperly in between the scheduled maintenance visits.

DETAILED DESCRIPTION

Figure 1:
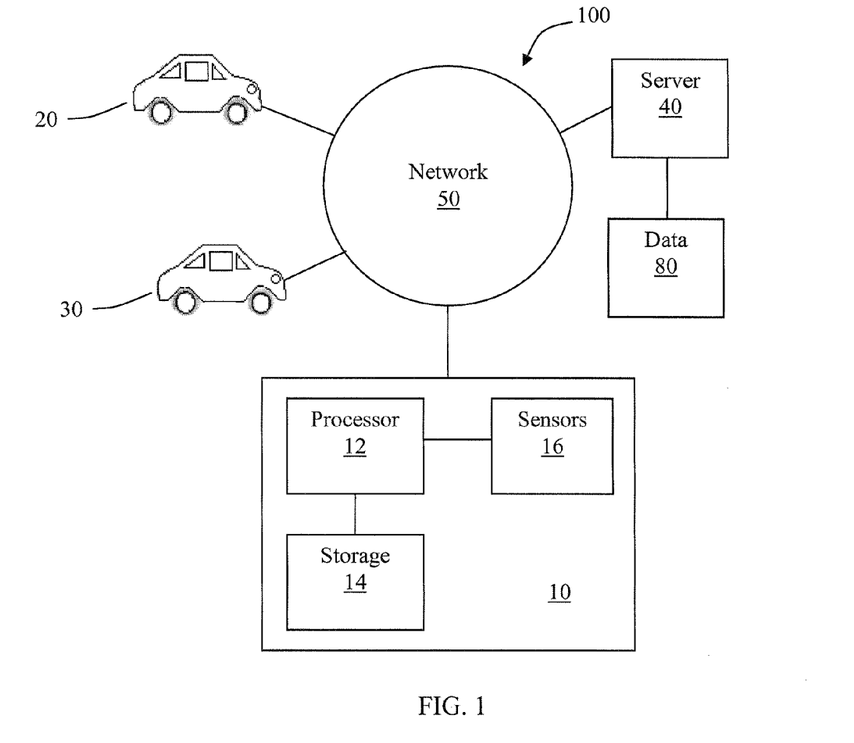
FIG. 1 depicts an example of a system including a network associated with monitoring and/or managing vehicle maintenance

FIG. 1 depicts an example of a system 100 including a network 50 associated with monitoring and/or managing vehicle maintenance. A plurality of vehicles, including vehicle 20 and vehicle 30, may be operatively coupled to network 50. Vehicle 20 and/or vehicle 30 may be associated with one or more users and/or operators.

Network 50 may comprise a public network or a private network established for personal use, business use, governmental use, or any combination thereof. For example, network 50 may comprise a cable network, a satellite network, a cellular network, a telephone network, a broadband network, a voice over Internet Protocol (VoIP) network, or any combination thereof. Furthermore, network 50 may comprise a wired network, a wireless network, a local area network, a wide area network, the Internet, a virtual network, or any combination thereof.

Network 50 may be operatively coupled to a device 10. Device 10 may be associated with a particular vehicle. In one example, device 10 may be communicatively coupled to, may be integrated with, or may comprise a vehicle, such as a car, a boat, a plane, a train, a motorcycle, a truck, an industrial vehicle, other types of vehicles, or any combination thereof. Furthermore, device 10 may comprise an on-board processor, a central processor, a mobile telephone, a smart-phone, a tablet, a personal computer, a laptop, a personal digital assistant (PDA), or any combination thereof.

Device 10 may comprise a processing device 12, one or more storage devices, such as a storage device 14, and one or more sensors 16 (hereafter referred to as sensors 16). Storage device 14 may be configured to store information associated with a vehicle, such as vehicle 20 and/or vehicle 30. The stored information may comprise subscription information, a vehicle identification, a user identification, vehicle operation data, maintenance statistics, maintenance plans, information associated with operation of a vehicle, or any combination thereof.

Storage device 14 may be configured to store instructions associated with one or more processes, programs, and/or operations associated with monitoring and/or managing vehicle maintenance. Processing device 12 may be configured to execute the stored instructions. Processing device 12 may access storage device 14 to run, store, and/or archive one or more programs. Storage device 14 may comprise random access memory (RAM), read-only memory (ROM), and/or other types of storage or memory devices.

Processing device 12 may be configured to receive substantially real-time operational data associated with the particular vehicle. In one example, processing device 12 may be configured to retrieve historic operational data associated with the particular vehicle, and to update the historic operational data with the real-time operational data. Additionally, processing device 12 may be configured to compare the updated historic operational data with a pre-existing maintenance standard, and to generate a maintenance plan for re-aligning the updated historic operational data with the pre-existing maintenance standard based, at least in part, on a result of the comparing.

Device 10 may be configured to generate, access, submit, track, process, compare, retrieve, display, and/or present information, such as: a maintenance plan, a history of maintenance activities, a maintenance standard, a maintenance recommendation, a vehicle operation concern, other information, or any combination thereof. The information may be associated with the particular vehicle and/or with one or more other vehicles. In one example, the information may be processed by a server 40 operatively coupled to network 50, and/or operatively coupled to device 10 via network 50.

Server 40 may be configured to perform some or all of the operations described above with respect to device 10 and/or processing device 12. A database 80 associated with server 40 may be configured to store information, such as subscription information, vehicle identification, user identification, vehicle operation data, maintenance statistics, maintenance plans, information associated with operation of a vehicle, or any combination thereof.

Device 10 may be configured to provide a vehicle, such as vehicle 20 and/or vehicle 30 with access to one or more web portals. A user may access their associated information remotely, such as via a mobile device. The mobile device may comprise a mobile communication device and a software application, including instructions, that may be installed on the mobile communication device.

In one example, device 10 may comprise a web-portal operatively connected to a vehicle, such as vehicle 20 and/or vehicle 30, through network 50. Device 10 may be configured to transmit the maintenance plan from the web-portal to the mobile communication device and/or a personal computer.

Sensors 16 may comprise an identification sensor configured to identify and/or detect operating conditions associated with a particular vehicle. Information associated with the particular vehicle may be stored in storage device 14. Additionally, sensors 16 may comprise a sensor configured to monitor operational data and/or record a vehicle operation history associated with the particular vehicle, such as a fuel efficiency, a noise level, an operating temperature, a system pressure, an emission level, a level of vibration, a tire pressure, a battery charge, other information associated with the particular vehicle, or any combination thereof.

Device 10 may be configured to identify a deviation between the updated historic operational data and the pre-existing maintenance standard, and to generate an alert when the deviation is identified. The pre-existing maintenance standard may be based, at least in part, on the historic operational data of the particular vehicle. In one example, the pre-existing maintenance standard may be associated with a population of similar vehicles as the particular vehicle. The population of similar vehicles may comprise vehicles having the same, or similar, characteristics as the particular vehicle, such as a make, a model, a class, a type, a weight, a length, a fuel type, options, a year of manufacture, hours of operation, other characteristics, or any combination thereof.

Device 10 and/or server 40 may be configured to monitor and/or collect vehicle operational data for a vehicle owner, an automobile dealer, and automotive repair shop, an automobile manufacturer, a rental company, an insurance company, an emergency response provider, a towing company, a service provider, or any combination thereof. The operational data and/or performance data may be monitored continuously during operation of the vehicle. Device 10 may be configured to transfer the operational data to server 40 over network 50. The operational data may be continuously transmitted, transmitted in batches at predetermined or scheduled time intervals, transmitted upon receipt of a communication signal, transmitted upon the occurrence of a particular event or a vehicle operation, or any combination thereof. Device 10 and/or server 40 may be configured to perform remote diagnosis of the vehicle operation based, at least in part, on the transmitted operational data.

Figure 2:
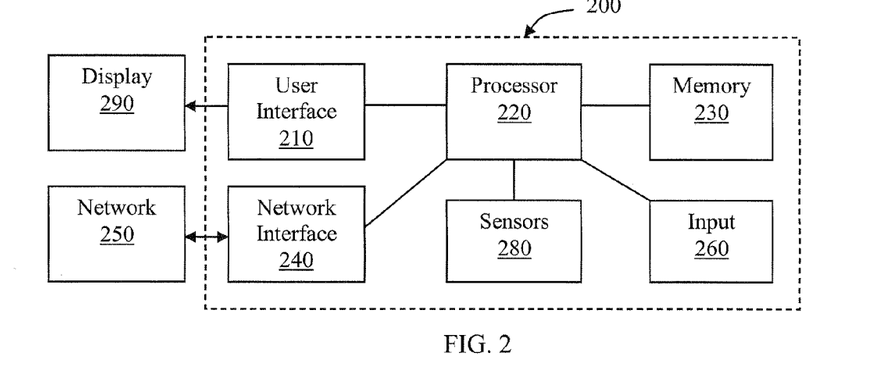
FIG. 2 depicts an example of an apparatus configured to monitor and/or provide maintenance services associated with vehicle operation.

FIG. 2 depicts an example of an apparatus 200 configured to monitor and/or provide maintenance services associated with vehicle operation. Apparatus 200 may comprise a processing device 220 operatively coupled to a memory device 230, one or more sensors 280 (hereafter referred to as sensors 280), a network interface 240, a user interface 210, and one or more input devices 260 (hereafter referred to as input devices 260).

Network interface 240 may comprise electronic circuits or programs configured to interface and/or communicate with a network 250, such as a wired network, a wireless network, or any combination thereof. Network interface 240 may be configured to provide one or more network connections. Network interface 240 also may be configured to interface with a mobile device, such as a smart-phone. In one example, and substantially similar to network 50 as described with respect to FIG. 1, network 250 may be configured to operatively couple apparatus 200 to a plurality of vehicles, such as vehicle 20 and/or vehicle 30 (FIG. 1).

Sensors 280 may comprise one or more devices configured to monitor vehicle operating conditions, such as a fuel efficiency, a noise level, an operating temperature, a system pressure, an emission level, a level of vibration, other information associated with a vehicle, or any combination thereof.

Memory device 230 may be configured to store instructions associated with an application program. Processing device 220 may be configured to execute the stored instructions. Processing device 220 also may be configured to access memory device 230 to run, store, and/or archive one or more programs. Memory device 230 may comprise RAM, ROM, and/or other types of storage or memory devices.

Processing device 220 may be configured to manage and/or to monitor information associated with vehicle operation. Processing device 220 additionally may be configured to receive input and/or commands from user interface 210 and/or input devices 260. Processing device 220 may be configured to receive, process, transfer, and/or present signals to display device 290 or a server, such as server 40 (FIG. 1), or any combination thereof.

User interface 210 may be operatively coupled to a display 290. Display 290 may comprise a liquid crystal diode (LCD) display, a light emitting diode (LED) display, a computer, a television, a monitor, a smart-phone, a plasma screen, a projection screen, other types of display devices, or any combination thereof. In one example, display 290 and/or user interface 210 may provide for, or may be configured with, buttons or touch-screen controls.

User interface 210 and/or display 290 may be configured to display vehicle identification, user identification, vehicle operation data, maintenance statistics, maintenance plans, information associated with operation of a vehicle, or any combination thereof. In one example, a maintenance plan associated with the particular vehicle may be generated based, as least in part, on both a manufacturer's suggested maintenance schedule and the vehicle operation data.

Apparatus 200 may be configured to receive substantially real-time operational data associated with the particular vehicle. Additionally, apparatus 200 may be configured to retrieve historic operational data associated with the particular vehicle and to update the historic operational data with the real-time operational data. In one example, the updated historic operational data may be compared with a pre-existing maintenance standard to generate a maintenance plan for re-aligning the updated historic operational data with the pre-existing maintenance standard based, at least in part, on a result of the comparing.

Operational data associated with the particular vehicle may be received and/or measured while the particular vehicle is being operated. The operational data may comprise a fuel efficiency, a noise level, an operating temperature, a system pressure, an emission level, a level of vibration, other information associated with the particular vehicle, or any combination thereof. The pre-existing maintenance standard may be based, at least in part, on operational data associated with a particular mode of operation of the vehicle. Additionally, the pre-existing maintenance standard may be based, at least in part, on historic operational data associated with the particular vehicle and/or other vehicles of a similar type, a similar make, a similar model, a similar year of manufacture, a similar number of accumulated hours of operation, or any combination thereof.

Apparatus 200 may be configured to generate an alert when the real-time operational data indicates a deviation from the historic operational data. The alert may comprise an audible and/or visual indication of a vehicle operation concern. In one example, the alert may be transmitted to a vehicle owner, an automobile dealer, an automotive repair shop, an automobile manufacturer, a rental company, an insurance company, an emergency response provider, a towing company, a service provider, or any combination thereof.

Figure 3:
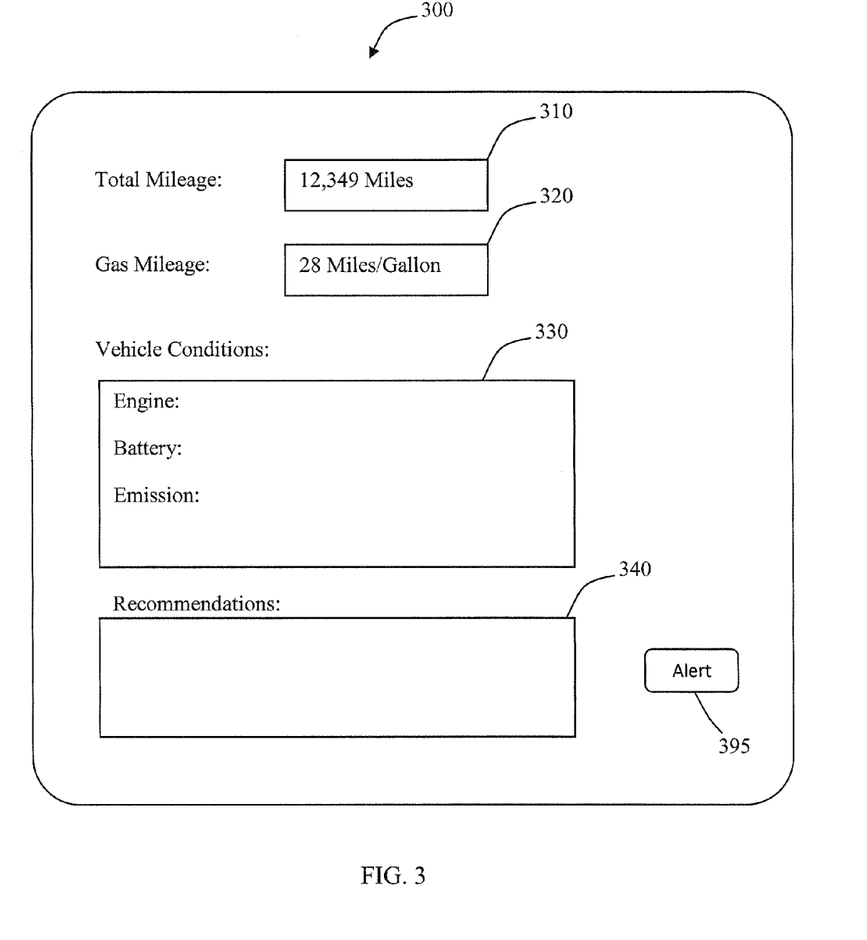
FIG. 3 depicts an example of a user interface configured to monitor and/or provide maintenance services associated with vehicle operation.

FIG. 3 depicts an example of a user interface 300 configured to monitor and/or provide maintenance services associated with vehicle operation. User interface 300 may be operatively coupled to, and/or may comprise, an input screen, a display device, a computer, a television, a monitor, a smartphone, a plasma screen, a LCD screen, a projection screen, a voice activated system, a key entry system, a text entry system, or any combination thereof. User interface 300 may be associated with a server, a service provider, a browser, a central processor, a mobile telephone, a smart-phone, a tablet, a personal computer, a laptop, a personal digital assistant (PDA), or any combination thereof. In one example, user interface 300 may be operatively coupled to a vehicle.

User interface 300 may be configured to communicate with a server over a network, and may be associated with one or more operators and/or vehicles. Information associated with an operator and/or a particular vehicle may be used to populate one or more fields of user interface 300. User interface 300 may be configured to display different types of operational information 330. Operational information 330 may include data associated with one or more systems and/or devices associated with the vehicle, such as an engine, a motor, a battery, a tire, a transmission, a clutch, a brake, a light, a sensor, a pump, a communication system, a climate control system, a steering system, a hydraulic system, an exhaust system, an emission system, a collision detection system, or any combination thereof.

User interface 300 may be configured to provide the user with a selection of one or more systems and/or devices associated with operational information 330, and to generate and/or display vehicle performance data based, at least in part, on the selection. For example, in response to the selection of an engine from operational information 330, a first vehicle performance data 310 may be configured to display the total mileage associated with the engine and/or the vehicle. Similarly, a second vehicle performance data 320 may be configured to display the gas mileage associated with the engine and/or the vehicle. First vehicle performance data 310 and/or second vehicle performance data 320 may be updated as operational information 330 changes.

In one example, data associated with operational information 330 may be charted and/or compared with data associated with a plurality of vehicles having a similar type, a similar make, a similar model, a similar year of manufacture, similar hours of operation, or any combination thereof, as the particular vehicle. If the data associated with operational information 330 is found to vary substantially from operational data associated with the plurality of similar vehicles, user interface 300 may be configured to generate an alert 395. Alert 395 may indicate an imminent vehicle operation deviation and/or indicate that the particular vehicle needs to reduce the level of performance of a system and/or device associated with operational information 330.

The particular vehicle may be identified and/or authenticated when the operator logs in to the system through user interface 300. User interface 300 may be configured to generate and/or display one or more recommendations 340. Recommendations 340 may include a recommendation to perform a particular maintenance and/or repair activity, a revision to a maintenance schedule, a recommendation to alter vehicle operation, such as reducing vehicle speed, a recommendation to charge a battery, a recommendation to change a vehicle fluid, a recommendation to replace a device and/or component, other recommendations, or any combination thereof.

Certain data displayed on user interface 300 may be generated in response to input received from the vehicle, for example from one or more sensors associated with the vehicle. Other data displayed on user interface 300 may be transferred from a central and/or remote database, for example, where certain operational data may be analyzed. In one example, data displayed on, or associated with, user interface 300 may be accessed by a mobile telephone and/or a personal computer.

User interface 300 may include, or be configured with, buttons or touch-screen controls. If the operator wants to know more about the gas mileage, for example, second vehicle performance data 320 may be selected by touching the corresponding portion of user interface 300. In one example, selection and/or control of user interface 300 may be performed by audible commands.

Figure 4:
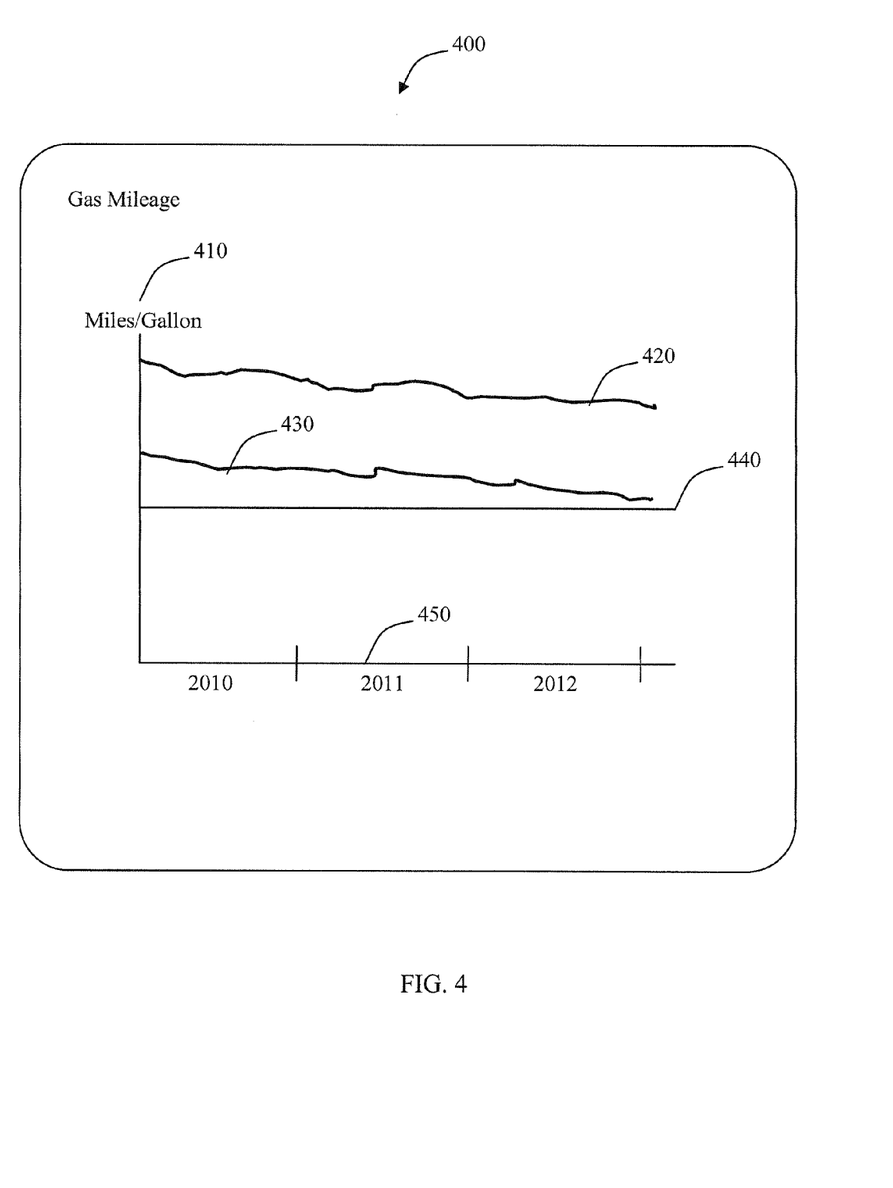
FIG. 4 depicts a further example of a user interface configured to monitor and/or provide maintenance services associated with vehicle operation.

FIG. 4 depicts a further example of a user interface 400 configured to monitor and/or provide maintenance services associated with vehicle operation. User interface 400 may be configured to monitor operational information associated with one or more vehicles, record activity associated with the usage, including operational information and/or data, display a history of the operational information as a function of time, or any combination thereof.

An exemplary graph of fuel efficiency may be displayed on user interface 400. User interface 400 may be configured to display fuel efficiency as a function of the number of miles per gallon on a vertical axis 410, and time on a horizontal axis 450. Fuel efficiency may vary depending on the road condition and the vehicle operating condition. The fuel efficiency may be determined and/or recorded at predetermined intervals.

User interface 400 may be configured to display a range of the operational information. The range may be determined based, at least in part, on a first history of operational information 420 and a second history of operational information 430. In one example, first history of operational information 420 may illustrate a first fuel efficiency, and second history of operational information 430 may illustrate a second fuel efficiency. The first fuel efficiency may be greater than the second fuel efficiency. For example, the first fuel efficiency may be associated with a first mode of vehicle operation, such as travel on a highway, and the second fuel efficiency may be associated with a second mode of vehicle operation, such as travel in a residential and/or commercial area of a city. In one example, user interface 400 may be configured to display an average of first history of operational information 420 and second history of operational information 430, such as an average fuel efficiency associated with the vehicle.

One or both of first history of operational information 420 and second history of operational information 430 may be compared with a threshold value 440. Threshold value 440 may indicate a minimum acceptable level of performance associated with normal operation of the vehicle. In response to determining that the level of vehicle performance is lower than threshold value 440, recommendation 340 and/or alert 395 (FIG. 3) may be generated. For example, the operator may be advised to change the vehicle's oil, obtain an engine tune-up, check the vehicle tire pressure, and/or perform other vehicle maintenance activities.

Additional charts similar to that shown in FIG. 4 may include operational information illustrating a fuel efficiency, a noise level, an operating temperature, a system pressure, an emission level, a level of vibration, a tire imbalance, a tire pressure, a battery charge/status, other information associated with the particular vehicle, or any combination thereof.

Figure 5:
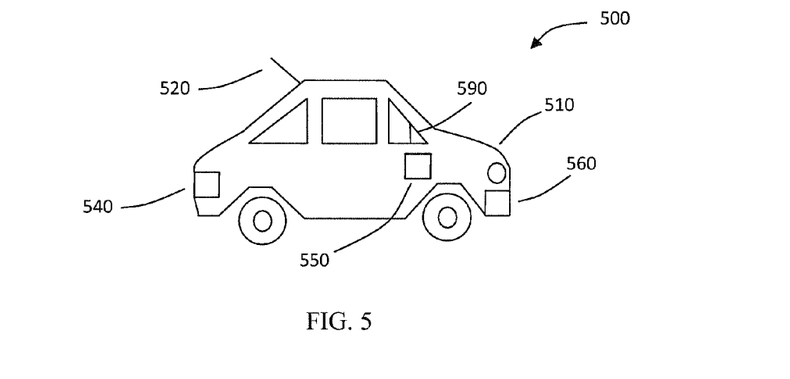
FIG. 5 depicts a vehicle including a system for monitoring and/or managing vehicle maintenance.

FIG. 5 depicts a vehicle including a system 500 for monitoring and/or managing vehicle maintenance. System 500 may comprise a processing device 550. Processing device 550 may be configured to run, store, and/or archive one or more programs. In one example, processing device 550 may be configured to store a record of vehicle operation over time, providing a subscriber history. System 500 may be configured to monitor vehicle performance associated with, and/or assigned to, one or more vehicles and/or operators.

System 500 may comprise one or more sensors, such as a rear sensor 540 and a front sensor 560, which may be configured to monitor one or more systems, devices, or states of operation vehicle 510, or any combination thereof. In one example, one or both of sensors 540, 560 may be configured to identify, sense, determine, read, receive, transmit, communicate, provide, acquire, and/or detect a vehicle speed, a vehicle position, a vehicle identification, a fuel efficiency, a noise level, an operating temperature, a system pressure, an emission level, a level of vibration, a tire imbalance, a tire pressure, a battery charge/status, other information associated with a particular vehicle, or any combination thereof.

System 500 may comprise a user interface 590 and a communication device 520. User interface 590 may operate substantially similar as user interface 300 and/or user interface 400 as depicted by FIG. 3 and FIG. 4, respectively. User interface 590 may be provided as a stand-alone or aftermarket device, or may be integrated into vehicle 510. Communication device 520 may be configured to transmit and/or receive information shared between vehicle 510 and a remote processing device.

Processing device 550 further may be configured to identify a location of vehicle 510. The location of vehicle 510 may be determined from a global positioning system. Processing device 550 may be configured to evaluate the input received from one or more of sensors 540, 560 to determine if vehicle 510 is performing satisfactorily.

Figure 6:
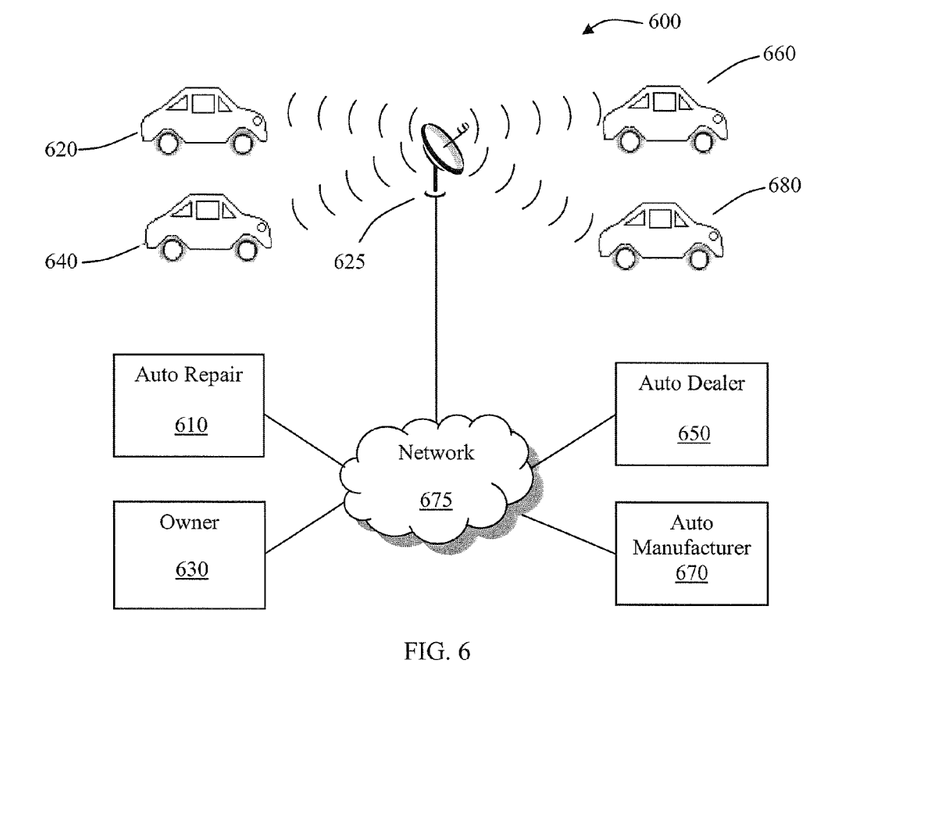
FIG. 6 depicts an example of a network system configured to monitor and/or provide maintenance services associated with vehicle operation.

FIG. 6 depicts an example of a network system 600 configured to monitor and/or provide maintenance services associated with vehicle operation. System 600 may comprise a network 675 operatively coupled to one or more service providers, such as an auto repair shop 610, an auto dealer 650, an auto manufacturer 670, a rental company, an insurance company, an emergency response provider, a towing company, other services providers, or any combination thereof. Additionally, network 675 may be operatively coupled to one or more vehicle owners 630.

Network 675 may comprise a public network and/or a private network established for personal use, business use, governmental use, or any combination thereof. For example, network 675 may comprise a subscriber network, a cable network, a satellite network, a cellular network, a telephone network, a broadband network, a voice over Internet Protocol (VoIP) network, or any combination thereof. Furthermore, network 675 may comprise a wired network, a wireless network, a local area network, a wide area network, a virtual network, or any combination thereof.

Vehicle owner 630 and service providers 610, 650, and/or 670 may be operatively coupled with one or more vehicles, such as a first vehicle 620, a second vehicle 640, and vehicles 660 and/or 680 via network 675 and/or one or more transponders, such as a transponder 625. Transponder 625 may be configured to receive and/or transmit a transmission from/to one or more vehicles, such as vehicles 620, 640, 660, and/or 680.

In one example, transponder 625 may comprise a base station. The communication may be received by the base station located in proximity to the particular vehicle. Similarly, the particular vehicle may be identified when the particular vehicle comes into a local proximity of the base station. In one example, system 600 may be configured to receive the communication comprising the data associated with the operating condition when a vehicle ignition system is turned off.

The communication may be transmitted from the base station to a processing device associated with a centralized processing center. The centralized processing center may be configured to remotely monitor operating conditions associated with a fleet of vehicles.

System 600 may comprise a memory device configured to store vehicle operation data associated with a plurality of vehicles, and a processing device. In one example, system 600 may be configured to receive input indicating an operating condition associated with a vehicle, such as first vehicle 620. System 600 further may be configured to compare the operating condition associated with first vehicle 620 with operating conditions associated with vehicles 640, 660, and/or 680. Based, at least in part, on the above-described comparing, system 600 may be configured to provide a recommendation of vehicle operation to first vehicle 620.

The input indicating an operating condition may be transmitted from a device located on first vehicle 620. In one example, the input may indicate a subscriber, such as an owner and/or operator of first vehicle 620, and the account may be associated with the subscriber. Transponder 625 may be configured to receive a communication from a particular vehicle, such as first vehicle 620. The communication may comprise data associated with the operating condition. System 600 may be configured to identify the particular vehicle from the communication.

System 600 may be configured to identify a second vehicle, such as second vehicle 640, associated with a similar type, a similar make, a similar model, a similar year of manufacture, similar hours of operation, or any combination thereof, as first vehicle 620. System 600 further may be configured to evaluate a first operating condition associated with first vehicle 620 with a second operating condition associated with second vehicle 640. A recommendation associated with first vehicle 620 may be generated based, at least in part, on the above-described evaluating.

In one example, system 600 may be configured to evaluate a history of operation associated with first vehicle 620 based, at least in part, on the history or histories of operation associated with other vehicles, such as vehicles 640, 660, and/or 680. For example, first vehicle 620 may be used primarily for commuting. Other vehicles also may be used for commuting a similar distance as first vehicle 620. Vehicles with similar histories of operation may be assumed to have the same amount of usage and/or require similar types of maintenance. Additionally, by comparing first vehicle 620 with a fleet of similar vehicles, the operating condition associated with first vehicle 620 can be evaluated to determine if first vehicle 620 is operating within a normal or expected range of performance.

Network 675 may comprise a web portal configured to provide monitoring and/or maintenance service information associated with a particular vehicle, such as first vehicle 620. In one example, the web portal may be managed by one or more service providers, such as service providers 610, 650, and/or 670. The web portal may be configured to provide owner 630 with access to the user information and/or maintenance services. For example, the information may be accessed by a device configured with a web browser and access rights.

System 600 may be configured to receive substantially real-time operational data associated with a particular vehicle, such as first vehicle 620. Additionally, system 600 may be configured to retrieve historic operational data associated with the particular vehicle and to update historic operational data with the real-time operational data. In one example, the operational data may comprise a fuel efficiency, a noise level, an operating temperature, a system pressure, an emission level, a level of vibration, a tire pressure, a battery charge, other information associated with the particular vehicle, or any combination thereof.

System 600 may be configured to compare the historic operational data with a pre-existing maintenance standard, and to generate a maintenance plan for re-aligning the historic operational data with the pre-existing maintenance standard based, at least in part, on a result of the comparing. In one example, the pre-existing maintenance standard may be based, at least in part, on the historic operational data of a particular vehicle, such as first vehicle 620. Additionally, or in the alternative, the pre-existing maintenance standard may be associated with a population of vehicles sharing a similar vehicle profile as the particular vehicle.

System 600 may be configured to identify a deviation between the real-time operational data and the historic operational data, and to generate an alert in response to identifying the deviation. In response to identifying a deviation between the updated historic operational data and the pre-existing maintenance standard, system 600 may be configured to generate an alert when the deviation from the pre-existing maintenance standard exceeds a normalized threshold. The threshold may be normalized based on vehicle information such as the type, the make, the model, the year of manufacture, similar hours of operation, or any combination thereof. In one example, the threshold may be normalized by adjusting the threshold value to account for differences in vehicle information as between the particular vehicle and one or more vehicles in the population of vehicles sharing the similar vehicle profile as the particular vehicle.

The historic operational data may provide a maintenance standard to determine a real-time vehicle operation status of the user. For example, if the comparison of the operational data with the historic operational data indicates a vehicle operation deviation, system 600 may generate a recommendation and/or an alert.

The operational information may be collected even when the engine associated with the particular vehicle is not running. The operational data may be stored in an electronic storage, such as a memory device located on first vehicle 620. When first vehicle 620 gets close to transponder 625, system 600 may be configured to establish communication between first vehicle 620 and one or more service providers, such as service providers 610, 650, and/or 670, and to transfer the operational data over network 675.

Transponder 625 may be located in a garage and/or home associated with the particular vehicle. In one example, transponder 625 may be located at a place of business of one or more service providers, such as service providers 610, 650, and/or 670.

When a particular vehicle, such as first vehicle 620, is in range and/or a particular proximity, transponder 625 may be configured to communicate with first vehicle 620 and to transfer the operational information over network 675. Service providers 610, 650, and/or 670 may have a database configured to store the operational data. Transponder 625 may be configured to transfer the operational information in response to identifying a particular vehicle that is a subscriber to a vehicle maintenance service.

The operation information may be stored and/or analyzed by one or more service providers, such as service providers 610, 650, and/or 670. Owner 630 may access the operational information and/or recommendations via a computing device such as personal computer, laptop, and/or mobile telephone. System 600 may be configured to perform remote diagnosis and/or remote maintenance services when the particular vehicle establishes communication with transponder 625. In one example, one or more processes may be performed via an on-board processing device located on the particular vehicle.

System 600 may be configured to provide auto repair shop 610 with operation information for providing preventive services, and/or to provide auto manufacturer 670 with information for improving reliability of vehicles. Additionally, system 600 may be configured to improve the satisfaction of vehicle owners by providing timely recommendations and alerts in between scheduled maintenance visits.

System 600 and/or one or more of service providers 610, 650, and/or 670 may be configured to perform some or all of the operations described with reference to processing device 12, processing device 220, and/or processing device 550 as depicted by FIGS. 1, 2, and 5, respectively.

Figure 7:
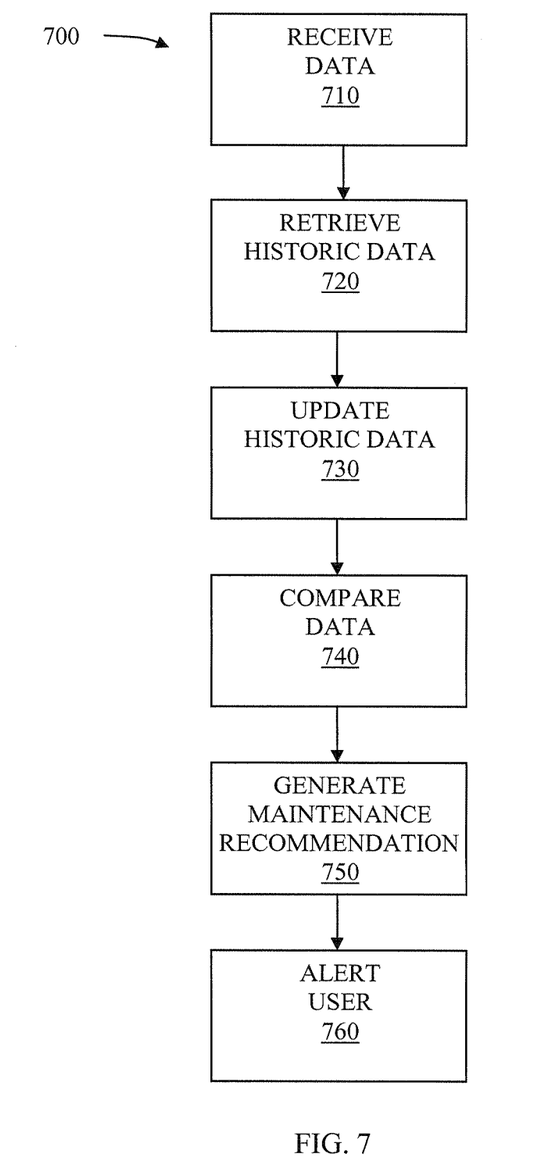
FIG. 7 depicts an example of a process for monitoring and/or providing maintenance services associated with vehicle operation.

FIG. 7 depicts an example of a process 700 for monitoring and/or providing maintenance services associated with vehicle operation. At operation 710, vehicle data associated with an operating condition of a particular vehicle may be received. The vehicle data may comprise an identification of a particular vehicle, an identification of an operator, a fuel efficiency, a noise level, an operating temperature, a system pressure, an emission level, a level of vibration, a tire pressure, a battery charge, other information associated with the particular vehicle, or any combination thereof. In one example, the vehicle data may be received in real-time, or near real-time.

At operation 720, historic operational data associated with the particular vehicle may be retrieved. The historic operational data may be retrieved from a storage device, a memory device, a communication device, a processing device, a server, or any combination thereof. The historic operational data may be associated with prior operation of the particular vehicle. In one example, the historic operational data may be retrieved based, at least in part, on an identification of the particular vehicle and/or an identification of a vehicle operator.

At operation 730, the historic operational data associated with the particular vehicle may be updated based on the vehicle data associated with the operating condition of the particular vehicle.

At operation 740, the updated historic operational data may be compared with a predetermined maintenance standard associated with a substantially similar type of vehicle. The substantially similar type of vehicle may comprise a vehicle having a similar type, a similar make, a similar model, a similar year of manufacture, similar hours of operation, or any combination thereof, as the particular vehicle.

The predetermined maintenance standard may be based, at least in part, on normalized operational data associated with the substantially similar vehicle, including a normalized noise level, a normalized operating temperature, a normalized system pressure, a normalized emission level, a normalized level of vibration, or any combination thereof. The operational data associated with the substantially similar vehicle may be normalized by excluding data which falls outside of an expected and/or acceptable range of data values. In one example, the operational data may be normalized by adjusting for differences in vehicle type as between the particular vehicle and the substantially similar vehicle. The predetermined maintenance standard may be revised and/or updated according to the normalized operational data associated with a fleet of substantially similar vehicles.

At operation 750, a maintenance recommendation may be generated based, at least in part, on a result of the comparing. The maintenance recommendation may be displayed to a user associated with the particular vehicle.

At operation 760, an alert may be generated when the operating condition indicates a deviation from the predetermined maintenance standard. The predetermined maintenance standard may be associated with a population of vehicles having the same type, the same make, the same model, the same year of manufacture, the same hours of operation, or any combination thereof, as the particular vehicle. In one example, the predetermined maintenance standard may be associated with a population of vehicles sharing a similar operational history as the particular vehicle. The alert may be generated when the vehicle data is inconsistent with an expected input of the particular vehicle, based on the population of similar types of vehicles.

Figure 8:
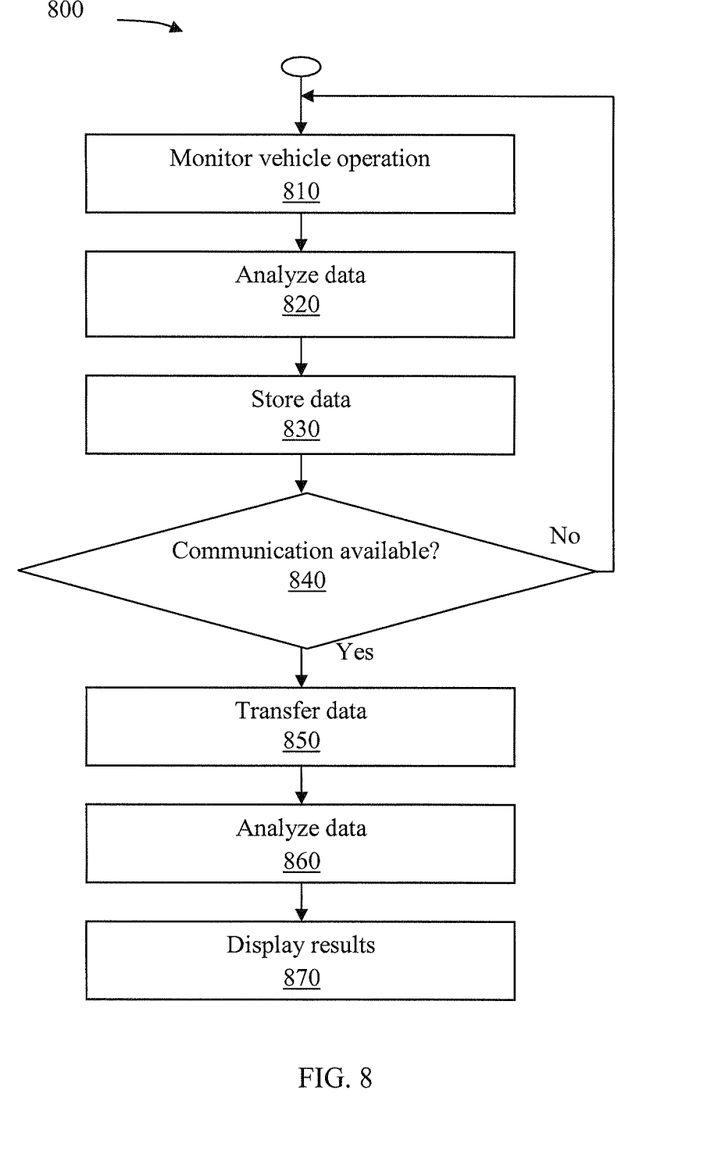
FIG. 8 depicts a further example of a process for monitoring and/or providing maintenance services associated with vehicle operation.

FIG. 8 depicts a further example of a process 800 for monitoring and/or providing maintenance services associated with vehicle operation. At operation 810, a vehicle operation may be monitored. In one example, the vehicle operation may be continuously monitored, for example, while the particular vehicle is being operated.

At operation 820, data associated with the vehicle operation may be analyzed. In one example, the data may be compared with historic vehicle operation associated with the particular vehicle and/or with a maintenance standard. An alert and/or a recommendation may be generated in response to the comparing.

At operation 830, the data and/or results of the analysis of operation 820 may be stored. In one example, the data and/or results of the analysis may be stored on the particular vehicle in a memory device.

At operation 840, a communication link may be checked to see if communication with the particular vehicle and/or with a communication device is available. The communication device may comprise a communication base, a receiving station, a wireless node, a wireless hub, other communication devices, or any combination thereof. If the communication link is not established, the process may return to operation 810 and continue to monitor and store data.

At operation 850, in response to determining that communication is available, the data and/or results of the analysis of operation 820 may be transferred to a central processing device.

At operation 860, the data and/or results of the analysis of operation 820 may be analyzed further. The data may be analyzed further by comparing the data with vehicle operations associated with one or more other vehicles of a similar type as the particular vehicle. Some of the data and/or results may be analyzed over time. The results of the data analyzed at operation 860 may be transmitted to a vehicle owner and/or operator via the Internet and/or via a communication device, such as a mobile telephone. In one example, the results may be transmitted to a server, a processing device, a PDA, or any combination thereof.

At operation 870, the results of the data analyzed at operation 860 may be displayed on a display device. The display device may comprise an LCD display, an LED display, a computer, a television, a monitor, a smart-phone, a PDA, a plasma screen, a projection screen, other types of display devices, or any combination thereof. In one example, the display device may be located in the particular vehicle.

The exemplary processes 700 and/or 800 depicted by FIG. 7 and FIG. 8, respectively, and the associated operations described therein, may be performed by one or more processing devices, such as processing device 12, processing device 220, system 500, and/or system 600 as depicted by FIGS. 1, 2, 5, and 6, respectively.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device that may be configured to interface with a networked system, locally and/or remotely, via a wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variations coming within the spirit and scope of the following claims.

The invention claimed is:

1. A method, comprising:
monitoring, by a processing device, data associated with an operating condition of a particular vehicle;
updating, by the processing device, historic operational data associated with the particular vehicle based on the data associated with the operating condition of the particular vehicle;
displaying, by the processing device, information designating one or more vehicle systems associated with the operating condition;
receiving, by the processing device, a user selection of a vehicle system from the displayed information;
retrieving, by the processing device, operational data associated with a different vehicle from a database, wherein the different vehicle is substantially similar to the particular vehicle;
adjusting, by the processing device, the operational data associated with the different vehicle to account for differences in vehicle type between the particular vehicle and the different vehicle;
comparing, by the processing device, the updated historic operational data with a predetermined maintenance standard associated with the different vehicle;
revising the predetermined maintenance standard based, at least in part, on the adjusted operational data associated with the different vehicle;
determining, by the processing device, whether the operating condition indicates a deviation in operation of the selected vehicle system from the adjusted operational data associated with the different vehicle based, at least in part, on comparing the updated historic operational data with the predetermined maintenance standard; and
generating, by the processing device, a maintenance recommendation for the particular vehicle in response to determining the deviation in operation of the selected vehicle system.

2. The method of claim 1, further comprising:
receiving, by the processing device, an identification of the particular vehicle; and
retrieving the historic operational data based, at least in part, on the identification of the particular vehicle.

3. The method of claim 2, wherein receiving the identification of the particular vehicle comprises receiving the identification of the particular vehicle that is operatively coupled to the processing device through a wireless network.

4. The method of claim 2, wherein receiving the identification of the particular vehicle comprises receiving the identification of the particular vehicle that is operatively coupled to the processing device through a mobile communication network.

5. The method of claim 1, further comprising determining the predetermined maintenance standard based, at least in part, on the historic operational data prior to the historic operational data being updated with the operating condition.

6. The method of claim 5, further comprising generating, by the processing device, an alert when the operating condition is inconsistent with an expected performance based on the predetermined maintenance standard.

7. The method of claim 1, further comprising determining the predetermined maintenance standard based on historic operational data associated with a population of similar type vehicles.

8. The method of claim 7, further comprising generating, by the processing device, an alert when the operating condition is inconsistent with an expected performance based on the population of similar type vehicles.

9. The method of claim 8, wherein the operating condition comprises a fuel efficiency of the particular vehicle, and wherein the fuel efficiency is less than the expected performance.

10. The method of claim 1, wherein the differences in vehicle type comprise differences associated with at least one of a vehicle make or a vehicle model.

11. A non-transitory memory device having instructions stored thereon that, in response to execution by a processing device, cause the processing device to perform operations comprising:
monitoring data associated with an operating condition of a particular vehicle;
updating historic operational data associated with the particular vehicle based on the data associated with the operating condition of the particular vehicle;
displaying information designating one or more vehicle systems associated with the operating condition;
receiving a user selection of a vehicle system from the displayed information;
identifying a substantially similar vehicle to the particular vehicle in a database;
identifying differences in vehicle type between the particular vehicle and the substantially similar vehicle;
retrieving operational data associated with the substantially similar vehicle from the database;
adjusting the operational data associated with the substantially similar vehicle to account for the differences in the vehicle type between the particular vehicle and the substantially similar vehicle;
revising a predetermined maintenance standard associated with the substantially similar vehicle based, at least in part, on the adjusted operational data;
comparing the updated historic operational data with the revised predetermined maintenance standard;
determining whether the operating condition indicates a deviation in operation of the selected vehicle system from the adjusted operational data associated with the substantially similar vehicle based, at least in part, on comparing the updated historic operational data with the revised predetermined maintenance standard; and
generating a maintenance recommendation for the particular vehicle in response to determining the deviation in operation of the selected vehicle system.

12. The memory device of claim 11, wherein monitoring the data associated with the operating condition comprises receiving input from one or more vehicle sensors.

13. The memory device of claim 11, wherein monitoring the data associated with the operating condition comprises receiving a wireless communication from the particular vehicle.

14. The memory device of claim 11, wherein the operating condition comprises a battery status or a fuel efficiency associated with the particular vehicle.

15. The memory device of claim 11, wherein the operations further comprise generating an alert when the data associated with the operating condition indicates a deviation from the revised predetermined maintenance standard.

16. The memory device of claim 11, wherein the operations further comprise:
  identifying a deviation between the updated historic operational data and the revised predetermined maintenance standard; and
  generating an alert when the deviation from the revised predetermined maintenance standard exceeds a threshold.

17. The memory device of claim 11, wherein the data associated with the operating condition is received from a wireless transmitter located on the particular vehicle.

18. The memory device of claim 17, wherein the wireless transmitter is configured to transmit the data associated with the operating condition to the processing device via a mobile communication network.

19. The memory device of claim 17, wherein the wireless transmitter is configured to transmit the data associated with the operating condition to the processing device via a local area network.

20. The memory device of claim 11, wherein the operations further comprise displaying a graphic chart configured to compare the updated historic operational data associated with the particular vehicle with the revised predetermined maintenance standard as a function of time.

21. The memory device of claim 11, wherein the differences in vehicle type further comprise differences associated with a year of manufacture.

22. The non-transitory memory device of claim 11, wherein the differences in vehicle type comprise differences associated with at least one of a vehicle make or a vehicle model.

23. An apparatus, comprising:
  a memory device configured to store instructions; and
  a processing device that, in response to executing the instructions stored in the memory device, is configured to:
    monitor data associated with an operating condition of a particular vehicle;
    update historic operational data associated with the particular vehicle based on the data associated with the operating condition of the particular vehicle;
    display information designating one or more vehicle systems associated with the operating condition;
    receive a user selection of a vehicle system from the displayed information;
    retrieve operational data associated with a different vehicle from a database, wherein the different vehicle is substantially similar to the particular vehicle;
    adjust the operational data associated with the different vehicle to account for differences in vehicle type between the particular vehicle and the different vehicle;
    display information designating one or more vehicle systems associated with the operating condition;
    compare the updated historic operational data with a predetermined maintenance standard associated with the different vehicle;
    revise the predetermined maintenance standard based, at least in part, on the adjusted operational data associated with the different vehicle;
    determine whether the operating condition indicates a deviation in operation of the selected vehicle system from the adjusted operational data associated with the different vehicle based, at least in part, on comparing the updated historic operational data with the predetermined maintenance standard; and
    generate a maintenance recommendation for the particular vehicle in response to determining the deviation in operation of the selected vehicle system.

24. The apparatus of claim 23, wherein the processing device is further configured to:
  receive a communication from the particular vehicle, wherein the communication comprises the data associated with the operating condition; and
  identify the particular vehicle from the communication.

25. The apparatus of claim 24, wherein the particular vehicle is identified when the particular vehicle comes into a local proximity of a base station.

26. The apparatus of claim 25, wherein the communication is transmitted from the base station to the processing device, and wherein the processing device is associated with a centralized processing center.

27. The apparatus of claim 26, wherein the centralized processing center is configured to monitor operating conditions associated with a fleet of vehicles.

28. The apparatus of claim 25, wherein the apparatus comprises a web-portal operatively connected to the base station through a network, and wherein the processing device is further configured to transmit the maintenance recommendation from the web-portal to a mobile communication device or a personal computer.

29. The apparatus of claim 23, wherein the apparatus comprises a mobile communication device, and wherein the instructions comprise a software application that is installed on the mobile communication device.

30. The apparatus of claim 23, wherein the processing device is further configured to generate an alert when the deviation indicates a vehicle malfunction.

31. The apparatus of claim 23, wherein the predetermined maintenance standard is based, at least in part, on the historic operational data of the particular vehicle.

32. The apparatus of claim 23, wherein the predetermined maintenance standard is associated with a population of similar type vehicles.

33. The apparatus of claim 23, wherein the differences in vehicle type comprise differences associated with at least one of a vehicle make or a vehicle model.

34. An apparatus, comprising:
  means for monitoring data associated with an operating condition of a particular vehicle;
  means for updating historic operational data associated with the particular vehicle based on the data associated with the operating condition of the particular vehicle;
  means for displaying information designating one or more vehicle systems associated with the operating condition;
  means for receiving a user selection of a vehicle system from the displayed information;
  means for retrieving operational data associated with a substantially similar type of vehicle, wherein the operational data associated with the substantially similar type of vehicle is adjusted to account for differences in vehicle type between the particular vehicle and the substantially similar type of vehicle, and wherein a predetermined maintenance standard is revised based, at least in part, on the adjusted operational data associated with the substantially similar type of vehicle; and
  means for comparing the updated historic operational data with the predetermined maintenance standard associated with the substantially similar type of vehicle, wherein the means for comparing comprises:
    means for determining whether the operating condition indicates a deviation in operation of the selected vehicle system from the adjusted operational data of the substantially similar type of vehicle based, at least in part, on comparing the updated historic operational data with the predetermined maintenance standard; and means for generating a maintenance recommendation for the particular vehicle in response to determining the deviation in operation of the selected vehicle system.

35. The apparatus of claim 34, further comprising means for receiving a communication comprising the data associated with the operating condition when a vehicle ignition system is turned off.

36. The apparatus of claim 35, wherein the communication is received by a base station located in proximity to the particular vehicle.

37. The apparatus of claim 34, further comprising means for generating an alert when the data associated with the operating condition indicates a deviation from the predetermined maintenance standard.

38. The apparatus of claim 34, wherein the means for monitoring comprises means for measuring the data associated with the operating condition while the particular vehicle is in operation.

39. The apparatus of claim 34, wherein the data associated with the operating condition comprises a measured value of the selected vehicle system, wherein the measured value comprises one or more of a noise level, an operating temperature, a system pressure, an emission level, or a level of vibration.

40. The apparatus of claim 34, wherein the adjusted operational data associated with the substantially similar type of vehicle excludes data which falls outside of an expected range of data values for the selected vehicle system.

41. The apparatus of claim 34, wherein the means for displaying comprises means for displaying a graphic comparison of the updated historic operational data associated with the particular vehicle with the predetermined maintenance standard as a function of time, and wherein the predetermined maintenance standard provides a minimum acceptable level of performance associated with a normal operation of the selected vehicle system.

42. The apparatus of claim 34, wherein the differences in vehicle type comprise differences associated with at least one of a vehicle make or a vehicle model.

* * * * *